US009361025B2

(12) United States Patent
Wen et al.

(10) Patent No.: US 9,361,025 B2
(45) Date of Patent: Jun. 7, 2016

(54) INFORMATION PROCESSING APPARATUS AND DISPLAY PROCESSING METHOD

(75) Inventors: Yinghsiang Wen, Ome (JP); Hiroyuki Yamazaki, Akiruno (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 183 days.

(21) Appl. No.: 13/569,917

(22) Filed: Aug. 8, 2012

(65) Prior Publication Data

US 2013/0135266 A1     May 30, 2013

(30) Foreign Application Priority Data

Nov. 30, 2011    (JP) ................................. 2011-262005

(51) Int. Cl.
    *G06F 3/038*       (2013.01)
    *G06F 3/06*        (2006.01)

(52) U.S. Cl.
    CPC ............ *G06F 3/0605* (2013.01); *G06F 3/0629* (2013.01); *G06F 3/0683* (2013.01); *G06F 2206/1008* (2013.01)

(58) Field of Classification Search
    CPC ....................................................... G06F 3/038
    USPC .......................................................... 345/204
    See application file for complete search history.

(56) References Cited

U.S. PATENT DOCUMENTS

| | | | |
|---|---|---|---|
| 6,313,834 B1 * | 11/2001 | Lau et al. ...................... 715/803 |
| 6,690,400 B1 * | 2/2004 | Moayyad et al. ............. 715/779 |
| 7,526,580 B2 | 4/2009 | Uno |
| 7,546,571 B2 * | 6/2009 | Mankin et al. ................ 716/137 |
| 7,555,719 B1 * | 6/2009 | Yehuda et al. ................ 715/736 |
| 7,882,287 B2 | 2/2011 | Uno |
| 8,250,245 B2 * | 8/2012 | Tanaka ........................... 710/14 |
| 8,281,257 B2 | 10/2012 | Ishiwata |
| 8,661,185 B2 * | 2/2014 | Thorp et al. .................. 711/103 |
| 2007/0174520 A1 * | 7/2007 | Moon ............................. 710/62 |
| 2008/0250172 A1 * | 10/2008 | Tanaka ........................... 710/63 |
| 2010/0175032 A1 * | 7/2010 | Ishiwata ....................... 715/853 |

FOREIGN PATENT DOCUMENTS

| | | |
|---|---|---|
| JP | 2000-148885 | 5/2000 |
| JP | 2005-216141 | 8/2005 |
| JP | 2006-059155 | 3/2006 |
| JP | 2010160638 | 7/2010 |
| JP | 2010-244655 | 10/2010 |

OTHER PUBLICATIONS

Machine translation of Japan Publication 2000148885 by Sano Tetsuya on May 30, 2000.*

(Continued)

*Primary Examiner* — Jason Olson
(74) *Attorney, Agent, or Firm* — Rutan & Tucker, LLP; William W. Schaal

(57) ABSTRACT

According to one embodiment, an information processing apparatus includes first, second, and third display controllers. The first display controller displays first information representing a storage device. The second display controller displays second information representing partitions of the storage device, if the one of the storage device is selected based on the first information. The third display controller displays third information representing a data file of the storage device.

24 Claims, 7 Drawing Sheets

(56) References Cited

OTHER PUBLICATIONS

Japanese Patent Application No. 2011-262005, First Office Action, mailed Dec. 18, 2012, (with English Translation).

Impress Watch Corporation, "Pandora Recovery," [online], Oct. 14, 2008, [searched on Dec. 5, 2012], Internet, <URL: http://web.archive.org/web/20081014162959/, http://www.forest.impress.co.jp/lib/sys/file/delundel/pandorarecov.html>.

Impress Watch Corporation, "Pandora Recovery (Image)," [online], [searched on Dec. 5, 2012], Internet, <URL: http://www.forest.impress.co.jp/lib/sys/file/delundel/image/pandorarecov_r.html>.

\* cited by examiner

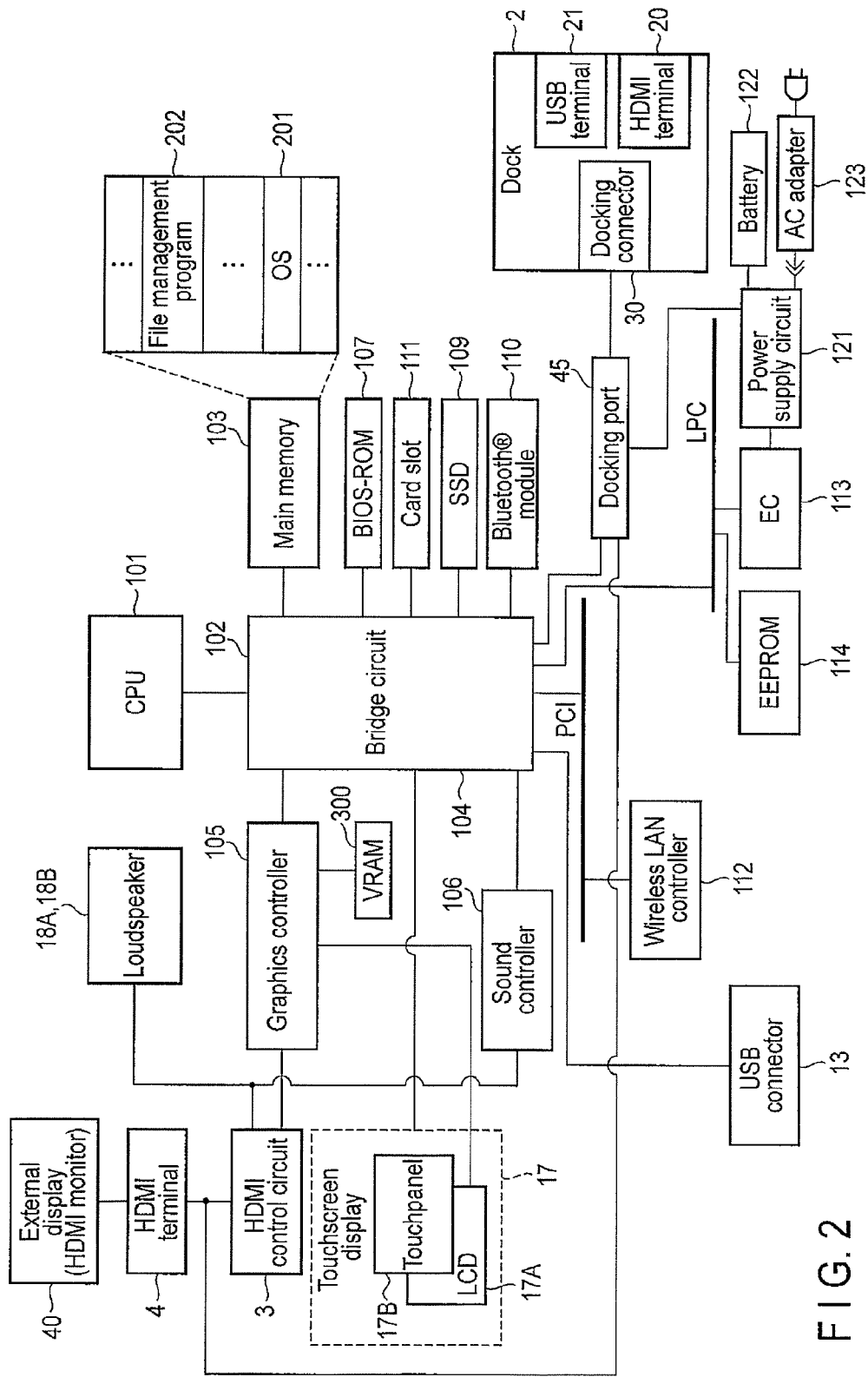
F I G. 2

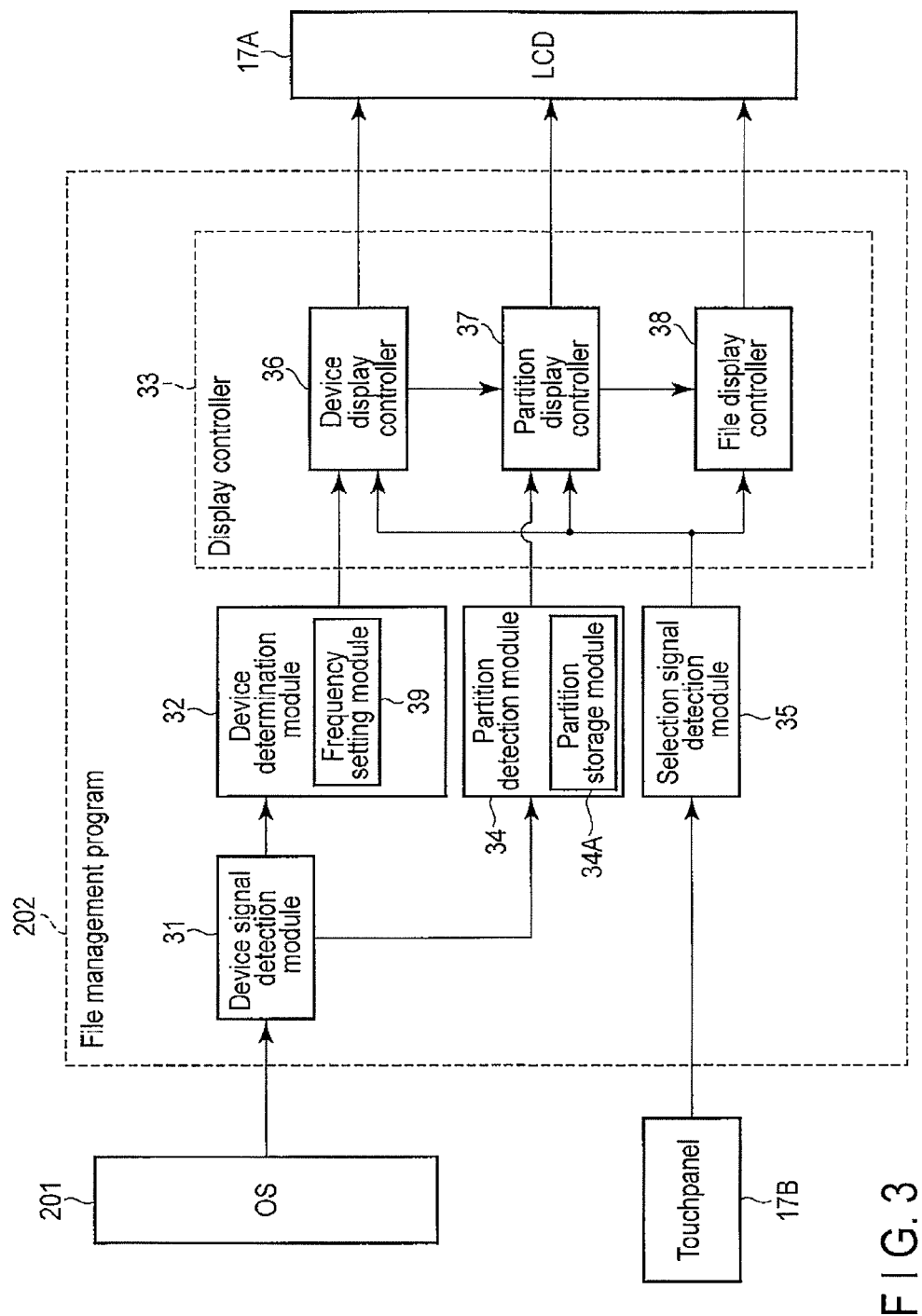
F I G. 3

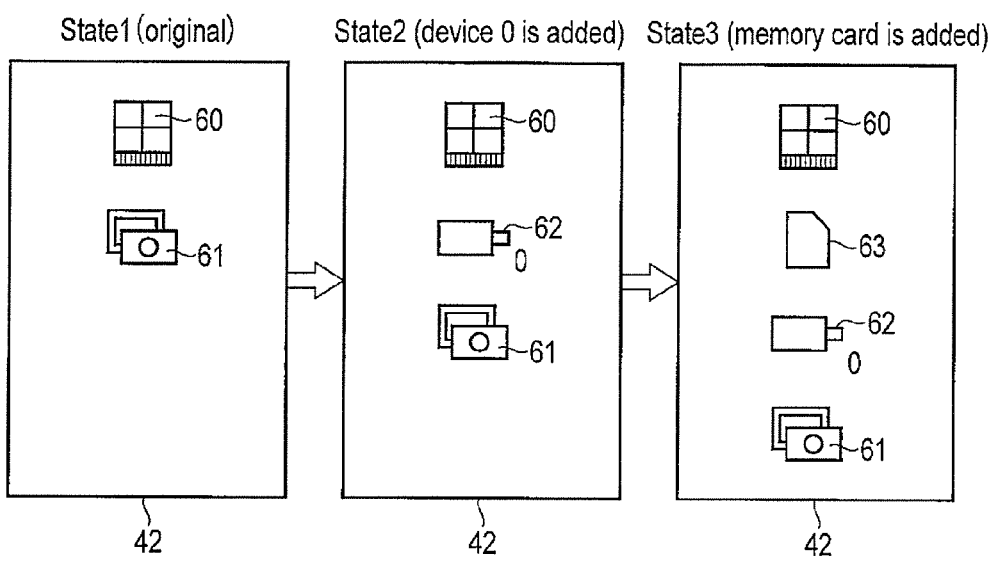
F I G. 6

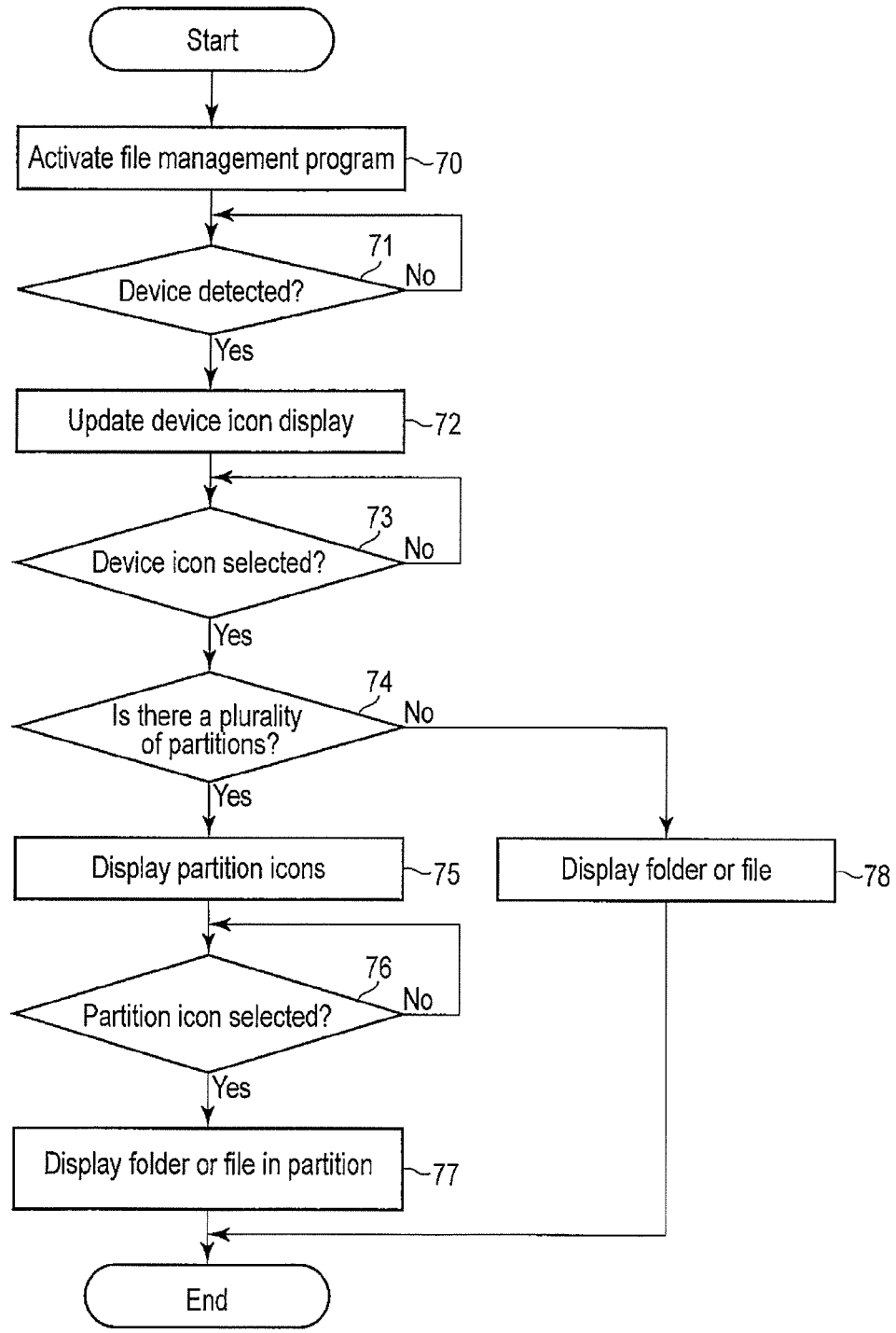
F I G. 7

INFORMATION PROCESSING APPARATUS AND DISPLAY PROCESSING METHOD

CROSS-REFERENCE TO RELATED APPLICATIONS

This application is based upon and claims the benefit of priority from prior Japanese Patent Application No. 2011-262005, filed Nov. 30, 2011, the entire contents of which are incorporated herein by reference.

FIELD

Embodiments described herein relate generally to an information processing apparatus and display processing method capable of displaying a list of data.

BACKGROUND

Recently, various information processing apparatuses such as a personal computer (PC) and tablet PC have been developed. Most information processing apparatuses of this type incorporate a data management application for managing data.

When data are stored in different locations, the file management application can generally list and display data stored in the different locations for the respective locations. By executing the data management application, the user can easily manage data even when data to be managed are stored in different locations. The data management application can also display a list of data storage locations.

However, when a device (to be also referred to as a partition device) divided into a plurality of partitions is managed, each of the respective partitions is recognized, listed, and displayed as a different storage location. When a plurality of partition devices are managed, a list of partitions is not displayed for each partition device. It is therefore difficult for the user to recognize the correspondence between partitions and a partition device.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing the system arrangement of the information processing apparatus according to the embodiment.

FIG. 3 is an exemplary block diagram showing an example of the structure of a file management program which runs on the information processing apparatus according to the embodiment.

FIG. 6 is an exemplary view showing state transition of a device display screen which is displayed by executing the file management program according to the embodiment.

FIG. 7 is an exemplary flowchart for explaining a processing procedure by the file management program according to the embodiment.

DETAILED DESCRIPTION

Various embodiments will be described hereinafter with reference to the accompanying drawings.

In general, according to one embodiment, an information processing apparatus includes a first display controller, a second display controller, and a third display controller. The first display controller displays first information representing at least one storage device. The second display controller displays second information representing partitions of one of the at least one storage device, if the one of the at least one storage device is selected based on the first information and the one of the at least one storage device comprises the partitions. The third display controller displays third information representing a data file of the one of the at least one storage device, if the one of the at least one storage device does not comprise the partitions.

The arrangement of the information processing apparatus according to the embodiment will be explained with reference to FIG. 1. The information processing apparatus can be implemented as a portable terminal such as a tablet computer, a laptop or notebook computer, or a PDA. In the following description, it is assumed that the information processing apparatus is implemented as a tablet computer 10 (to be referred to as a computer 10).

Figure 1:
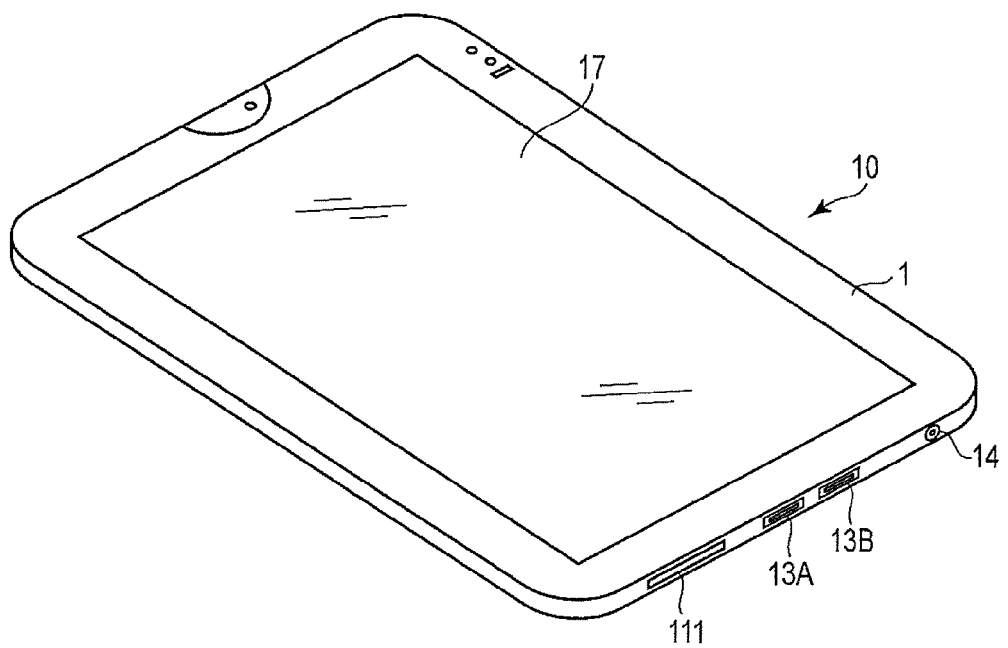
FIG. 1 is an exemplary perspective view showing the outer appearance of an information processing apparatus according to an embodiment.

FIG. 1 shows the outer appearance of the computer 10. The computer 10 includes a computer main body 1 and touchscreen display 17. The computer main body 1 includes a low-profile housing. The touchscreen display 17 is arranged on the surface of the computer main body 1. The touchscreen display 17 includes a flat panel display (for example, a liquid crystal display [LCD]) and a touchpanel. The touchpanel is arranged to cover the LCD screen. The touchpanel is configured to detect a position on the touchscreen display 17 that is touched by a user's finger or a pen.

The computer main body 1 includes a card slot 111, Universal Serial Bus (USB) connectors 13A and 13B, and an AC adapter connection terminal 14. The card slot 111 is arranged on one side of the computer main body 1, and is a port for mounting a card memory device. The card memory device is, for example, an SD® memory card. Each of the USB connectors 13A and 13B (to be referred to as USB connectors 13) is arranged on one side of the computer main body 1. The USB connector 13 is a connector for connecting a USB device. The USB device is, for example, a USB storage device including a USB terminal connectable to the USB connector 13. The AC adapter connection terminal 14 is a connector for connecting an AC adapter necessary to supply power.

Note that the computer 10 may be connectable to a dock. The dock may include, for example, a power supply terminal for connecting an external power supply such as the AC adapter. In this case, when the computer 10 is mounted on the dock, it is driven by power supplied from the external power supply connected to the dock. When the computer 10 is mounted on the dock, the internal battery of the computer 10 is charged by power provided from the external power supply.

FIG. 2 is a block diagram showing an example of the system arrangement of the computer 10.

The computer 10 includes a central processing unit (CPU) 101, a bridge circuit 102, a main memory 103, a graphics controller (GPU) 105, a sound controller 106, a BIOS-ROM 107, a solid-state drive (SSD) 109, a Bluetooth® module 110, the card slot 111, a wireless LAN controller 112, an embedded controller (EC) 113, an EEPROM 114, the USB connector 13, the touchscreen display 17, a video memory (VRAM) 300, and the like.

The CPU 101 is a processor which controls the operation of each component in the computer 10. The CPU 101 executes an operating system (OS) 201 and various application programs which are loaded from the SSD 109 into the main memory 103. The application programs include a file management program 202.

The file management program 202 is a program for managing a data file, and/or a program for managing storage devices connected to and/or incorporated in the computer 10. The file management program 202 is also called a file manager or file management (viewing) application. The file management program 202 performs processing to display information representing the connected and/or incorporated storage devices as a list (device list) in a specific order.

The file management program 202 can display a list of data file names. Managing a data file may include moving or copying the data file to another storage location, or deleting the data file.

The file management program 202 displays the information representing the storage devices on a device basis. The device basis means each storage device connected to the computer 10, and is not a partition (disk partition) basis of the storage device. In other words, the device basis is a storage device basis (storage basis) of a device connected to the computer 10, and is not the (disk) partition basis of the connected storage device. In the embodiment, the file management program 202 recognizes the storage device on the device basis and may display the information representing the storage devices on the device basis.

If one of the storage devices is selected based on the displayed information and the selected storage device includes a plurality of partitions, the file management program 202 displays information representing the partitions of the storage device. That is, in the embodiment, the file management program 202 performs the display in two-step method. When there are a plurality of partitions, in the two-step method, the information representing the storage device is displayed and then the information representing the partitions contained in the storage device is displayed. This two-step method differs from a general two-step method of displaying a list of data folder names, a data folder storing a plurality of data files, and then displaying a list of data file names in the data folder.

Further, the file management program 202 determines display positions or a display order of items of the information representing the storage device based on a frequency of the storage device, and displays the items of the information representing the partitions at the display positions or in the display order. The frequency is a use frequency of a storage device used by a user. The frequency will be described later with reference to FIG. 3. For example, when the user uses the card memory device more frequently than a USB memory device, the file management program 202 displays the information representing the card memory device above the information representing the USB storage device.

In the embodiment, it is assumed that the OS 201 is an Android® OS. That is, it is assumed that the computer 10 is a system using the Android® OS, and the Android® OS is installed in the computer 10. In the embodiment, the information representing the storage devices connected to the computer 10 can be displayed on the device basis. In the embodiment, an OS other than the Android® OS may be installed as the OS 201 in the computer 10. The system described in the embodiment can be applied to a system in which another OS is installed. Thus, the system described in the embodiment can be applied to even the computer 10 in which an OS other than the Android® OS is installed.

The CPU 101 also executes a Basic Input/Output System (BIOS) stored in the BIOS-ROM 107. The BIOS is a program for controlling hardware.

The bridge circuit 102 is a bridge device which connects devices on the local bus of the CPU 101, those on a Peripheral Component Interconnect (PCI) bus, and those on a Low Pin Count (LPC) bus. The bridge circuit 102 incorporates an Integrated Drive Electronics (IDE) controller for controlling the SSD 109. Further, the bridge circuit 102 has a function of executing communication with the sound controller 106. The bridge circuit 102 also has a function of executing communication with the GPU 105 via a PCI EXPRESS serial bus or the like.

The GPU 105 is a display controller which controls an LCD 17A used as the display monitor of the computer 10. A video signal (also called a display signal) generated by the GPU 105 is sent to the LCD 17A. The GPU 105 can send a video signal to an external display 40 via an HDMI control circuit 3 and HDMI terminal 4.

The sound controller 106 is a sound source device, and outputs audio data to be reproduced to loudspeakers 18A and 18B. The wireless LAN controller 112 is a wireless communication device which executes, for example, IEEE 802.11 wireless communication.

The EC 113 is an embedded controller for power management. The EC 113 has a function of turning on/off the computer 10 in accordance with a user operation. A power supply circuit 121 generates an operation power to be supplied to each component using power supplied from a battery 122 in the computer 10 or power supplied from an external power supply such as the AC adapter 123. The power supply circuit 121 also charges the battery 122 using power supplied from the external power supply.

The touchscreen display 17 incorporates a touchpanel 17B in addition to the LCD 17A. The touchpanel 17B superposed on the LCD 17A includes a sensor and microcontroller unit (MCU). When a touch operation is performed on the touchpanel 17B, the sensor detects the touched position, and the MCU outputs input information containing the touched position on the touchpanel 17B.

The video memory (VRAM) 300 is connected to the graphics controller 105. For example, the video memory (VRAM) 300 stores screen image data corresponding to a screen image to be displayed on the external display 40 or LCD 17A.

Note that a partition is a divided area in the storage device. By dividing a storage area of one storage device into a plurality of areas (partitions), the respective divided areas can be used as if they were different storage devices. In the embodiment, even when one storage device includes a plurality of partitions, the respective partitions are not recognized as different storage devices, but the storage device including these partitions is regarded as one storage device. A partition is one of locations where data are stored.

Attention is paid to the data capacity (size) to explain the difference between a partition and a data file. The size of each partition is determined by dividing the size of the entire storage area of the storage device. Hence, the sizes of the respective partitions are constant regardless of the sizes of data stored in the partitions. To the contrary, the size of a data file changes depending on the size of data stored in the data file.

In the embodiment, the storage device may be an internal storage arranged in the computer 10, the first removable storage which can be externally connected to the computer 10, and the second removable storage which can be externally connected to the computer 10 and is rarely removed from the computer 10, compared to the first removable storage. The internal storage may be a storage device which cannot be removed from the computer 10. The first and second removable storages may be mobile storages which can be carried by the user. The first removable storage may be a USB device which is connected to the computer 10 via the USB connector. The second removable storage may be an SD Card® serving as a card memory storage which is connected to the computer 10 via the card slot 111.

As described above, the data file may be one other than a document file or video file, and may be a music file, a file which forms an application (for example, a file storing application set values as data), or a file representing the shortcut of an application. Further, the data file may be a data folder which stores another data file. The data folder is a data file corresponding to the upper layer of the data file.

The data file is data stored in the file format, and is a document data file, video data file, or the like. Managing the data file also allows changing the attribute (property) of the data file. The attribute of the data file is a location where the data file is stored, the presence/absence of the data file, the authority to use the data file, or the like. In addition, the attribute of the data file is a date and time when the data file was created, the type (for example, extension) of the data file, the size (capacity) of the data file, or the like.

Next, details of the function of the file management program 202 will be explained with reference to FIG. 3.

The file management program 202 includes a device signal detection module 31, device determination module 32, display controller 33, a partition detection module 34, and a selection signal detection module 35.

The device signal detection module 31 is connected to the OS 201 and device determination module 32. The device signal detection module 31 detects a signal representing that the storage device has been connected to (to be also referred to as "mounted in") the computer 10, or a signal representing that the storage device has been disconnected from (to be also referred to as "unmounted from") the computer 10. These signals (to be also referred to as device signals) are, for example, mount event messages sent from a system such as the OS 201. The mount event message may be a signal broadcasted from the system. When the device signal detection module 31 detects the device signal, it sends a device detection result serving as the detection result to the device determination module 32 and partition detection module 34.

The device determination module 32 includes a frequency setting module 39. The device determination module 32 is connected to the device signal detection module 31, a device display controller 36, and the partition detection module 34. The device determination module 32 determines a mounted storage device or an unmounted storage device. More specifically, the device determination module 32 determines the type of the mounted storage device or the unmounted storage device. Details of the type of storage device will be described later. The device determination module 32 determines the type of the storage device based on the device detection result received from the device signal detection module 31.

An estimated frequency at which the storage device is supposed to be connected or mounted is set in the frequency setting module 39. The frequency is set in advance in the frequency setting module 39 for each storage device. In other words, the frequency is set not for each partition but for each storage device. Details of the frequency will be described later. The device determination module 32 associates the determined storage device with the frequency based on the frequencies set in the frequency setting module 39. The device determination module 32 sends the association result to the device display controller 36.

A method of setting the frequency will be described. The frequency is, for example, a use frequency indicating an estimated frequency at which the storage device is supposed to be used, or a mount frequency indicating an estimated frequency at which the storage device is supposed to be mounted in the computer 10.

The use frequency is a user use frequency indicating the possibility at which the user uses the storage device. More specifically, when the card memory device and the USB storage as mentioned above are mounted in the computer 10, the user use frequency becomes higher for the card memory device than for the USB storage because the user is highly likely to use the card memory device more than the USB storage. The use frequency may be a relative frequency, as described above, but may be an absolute frequency specific to a storage device.

Alternatively, the use frequency may be an access frequency indicating the possibility of access to data stored in the storage device. More specifically, when the count of access to data stored in a given storage device is higher than that of access to data stored in another storage device, the access frequency of the given storage device becomes higher than that of the other storage device.

The mount frequency may be, for example, the count at which the storage device is supposed to be mounted in the computer 10, or the period during which the storage device is supposed to be mounted in the computer 10.

The display controller 33 includes the device display controller 36, a partition display controller 37, and a file display controller 38. The display controller 33 controls to display, on the LCD 17A, the result of processing executed by the file management program 202.

The device display controller 36 is connected to the device determination module 32, the partition display controller 37, the LCD 17A, and the selection signal detection module 35. Based on the association result received from the device determination module 32, the device display controller 36 sends, to the LCD 17A, a signal for displaying information representing at least one storage device on the LCD 17A. The device display controller 36 displays information representing a plurality of storage devices based on the frequency, and aligns and displays information representing a plurality of storage devices in an order corresponding to the frequency. Details of the storage device display contents will be described later with reference to FIG. 4.

The selection signal detection module 35 will be explained. The selection signal detection module 35 is connected to the device display controller 36, the partition display controller 37, the file display controller 38, and the touchpanel 17B. The selection signal detection module 35 detects a selection signal representing that the storage device has been selected. The selection signal suffices to be a signal for designating the storage device. For example, the selection signal is a signal of input information containing a touched position on the touchpanel 17B, as described above. The selection signal detection module 35 notifies the device display controller 36, the partition display controller 37, and the file display controller 38 that the selection signal has been detected.

Based on the notification received from the selection signal detection module 35, the device display controller 36 controls a display representing that the storage device has been selected. An example of the display representing that the storage device has been selected will be described with reference to FIG. 4. The device display controller 36 sends, to the partition display controller 37, information about the selected storage device.

The partition display controller 37 is connected to the device display controller 36, the file display controller 38, the LCD 17A, the selection signal detection module 35, and the partition detection module 34. The partition display controller 37 controls to display the information representing partition of the storage device. Based on the selected storage device information received from the device display controller 36, the partition display controller 37 controls to display, on the LCD 17A, the information representing the partitions which are contained in the partition information received from the partition detection module 34 and correspond to the selected storage device information. Based on the notification received from the selection signal detection module 35, the partition display controller 37 sends selected partition information to the file display controller 38.

The partition detection module 34 is connected to the device signal detection module 31, the partition display controller 37, and the selection signal detection module 35. The partition detection module 34 includes a partition information storage module 34A. The partition detection module 34 detects the partitions of the mounted storage device and generates the partition information. Details of the partition information will be described later with reference to FIG. 5. The partition detection module 34 sends the generated partition information to the partition display controller 37. The partition detection module 34 associates a detected storage device with the partition information of the storage device. The partition information storage module 34A stores the associated partition information. Based on a notification which is received from the selection signal detection module 35 and represents that the storage device has been selected, the partition detection module 34 sends, to the partition display controller 37, the partition information which is stored in the partition information storage module 34A and corresponds to the selected storage device.

The file display controller 38 is connected to the partition display controller 37, the LCD 17A, and the selection signal detection module 35. The file display controller 38 controls to display the data file name. Based on the selected partition information received from the partition display controller 37, the file display controller 38 sends, to the LCD 17A, a signal for displaying, on the LCD 17A, a name of data file contained in the selected partition. When the data file is selected based on a notification received from the selection signal detection module 35, the file display controller 38 sends a notification to the LCD 17A to display data in the data file on the LCD 17A.

An example of the display of the file management program 202 will be explained with reference to FIG. 4.

Figure 4:
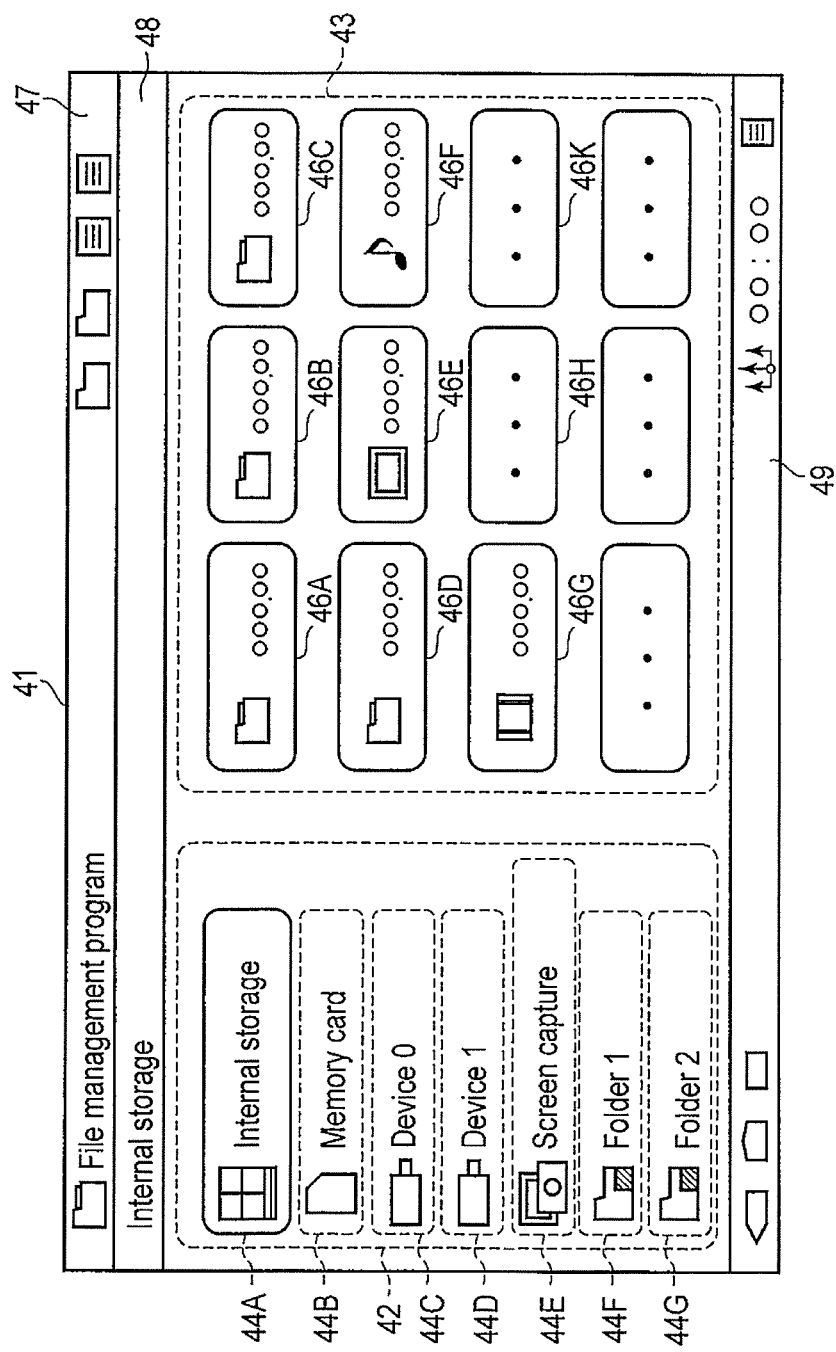
FIG. 4 is an exemplary view showing an example of a device display screen and data file display screen which is displayed by executing the file management program according to the embodiment.

FIG. 4 shows an example of displaying the layout of GUIs (for example, menus and buttons) for operating the file management program 202.

A file management program display screen 41 which is displayed on the LCD 17A during execution of the file management program 202 includes a device area 42, a data file area 43, status areas 47, status areas 48, status areas 49, and the like.

The device area 42 is an area where an item 44A representing the storage device or the type of the storage device is displayed. The device area 42 may display items 44B to 44D representing a plurality of storage devices in addition to the item 44A. Assume that a plurality of storage devices are mounted in the computer 10. Also, assume that these storage devices are storage devices of different types. In the device area 42, items representing different types corresponding to the respective storage devices are displayed. In FIG. 4, some storage devices are of the same type. More specifically, the items 44A to 44D represent the types of the storage devices, and the names of the items 44A to 44D represent the storage devices. In FIG. 4, an internal storage is selected. Details of the type of the storage device will be described later.

In the device area 42, internal storage items are displayed above a removable storage items. As for the removable storage, an item for a card removable memory storage other than the USB storage is displayed above an item or items for the USB storage. Further, items for an application which uses a specific folder, the shortcut of a folder, and the like are displayed below the removable storage items. A list of storage devices and the like mounted in the computer 10 is displayed in this order.

More specifically, in FIG. 4, the item 44A representing the internal storage, item 44B representing the card memory storage, item 44C representing one of USB storages, item 44D representing another one of the USB storages, an item 44E representing an application which uses the specific folder, an item 44F representing the shortcut of a folder, and an item 44G representing the shortcut of another folder, are displayed in the device area 42 in the order named.

Each of the items 44A to 44G includes an icon and name representing the storage device corresponding to the item. For example, for the item 44B, "memory card" which is the name of the card memory storage is displayed on the right side of an icon representing the card memory storage, as shown in FIG. 4. Although the same icon may be used for storage devices of the same type such as the items 44C and 44D, the names of the storage devices are displayed so that they can be discriminated, such as "device 0" and "device 1".

The item 44B, and item 44C or item 44D are displayed not in the mounting order but in the frequency-based order as described above. However, storage devices of the same type such as the items 44C and 44D are displayed in the mounting order from the top. In this way, when the storage devices of the same type are mounted, the respective items of the storage devices are displayed.

The item 44A is displayed at the top in the device area 42. The item 44A is the storage device, for example, the internal storage which cannot be removed from the computer 10. The item 44A is always displayed in the device area 42.

The item 44B represents the removable storage other than USB storage, for example, a storage device such as the SD Card® which is supposed to be kept mounted in the computer 10. That is, the item 44B represents a storage device which is rarely removed from the computer 10.

The items 44C and 44D represent storage devices, for example, the USB storage which is highly likely to be removed from the computer 10.

The item 44E represents an application which uses the specific folder. The specific folder is a folder which cannot be deleted or in which no new folder can be created. The specific folder is, for example, a data folder which stores data captured by an application for capturing a screen displayed on the LCD 17A.

Each of the items 44F and 44G represents the shortcut of a predetermined folder. The item 44F represents a shortcut created before a shortcut represented by the item 44G. An item representing a shortcut is displayed below in the device area 42.

The type of the storage device is, for example, the type of interface or port for connecting the storage device and the computer 10, or the type of the storage device which stores data. Since a plurality of storage devices are assumed, the types of the storage devices are given by a plurality of items representing the types of respective storage devices, as shown in FIG. 4. The interface or port is, for example, the USB connector 13, card slot 111, or the like. The type of storage device which stores data is, for example, the type represented by a nonvolatile memory or volatile memory. The storage device may be determined based on the difference between the types of storage devices.

The storage device may also be determined based on device information. The device information is, for example, the device information or device code of the storage device. The device information is recorded in each storage device, and each storage device can be discriminated from another storage device by acquiring unique device information from the storage device. When the storage device is mounted in the computer 10, partition information is recorded at, for example, the start position of an area where data is stored in the storage device. The OS 201 can acquire the partition information, thus the OS 201 can obtain information about, for example, the number of partitions of the mounted storage device.

FIG. 4 shows an example of a display screen when the item 44A representing the internal storage is selected. The area displaying the item 44A is highlighted, compared to the remaining items. For each item in the device area 42, only an icon (to be also referred to as a device icon) representing each storage device, or only the name of each storage device may be displayed. As the name of a storage device, it suffices to display a name capable of identifying the storage device. The name of the storage device is recorded in each storage device and can be acquired as information from the storage device. The name of the storage device may be displayed in each item based on the acquired storage device name information.

Next, the data file area 43 will be described.

The data file area 43 is an area where data files in the storage device are displayed. FIG. 4 shows items 46A, 46B, 46C, . . . representing data files (also referred to as data files 46). For example, items 46A, 46B, 46C, and 46D represent data folders. An item 46E represents a data file for photographic data. An item 46F represents a data file for music data. An item 46G represents a data file for video data.

In FIG. 4, an items 46H and 46K in the data file area 43 may be data files representing document data. It is also possible to represent that neither the item 46H nor the item 46K contains data. When neither the item 46H nor the item 46K contains data, both of them may not be displayed in the data file area 43. The data file area 43 may contain a data file called a hidden file. The hidden file is a data file containing application set values, parameters, or the like. Although a plurality of data files are displayed in FIG. 4, one data file may be displayed.

The status areas 47, 48, and 49 may display information about a selected storage device, information about a storage device connected to the computer 10, an icon for changing the display order of data files displayed in the data file area 43, an icon for creating the shortcut of the data file, such as items 44F and 44G, an icon for displaying the data file in a storage device selected before a currently selected storage device, and the like.

An example of the display of a partition will be described with reference to FIG. 5.

Figure 5:
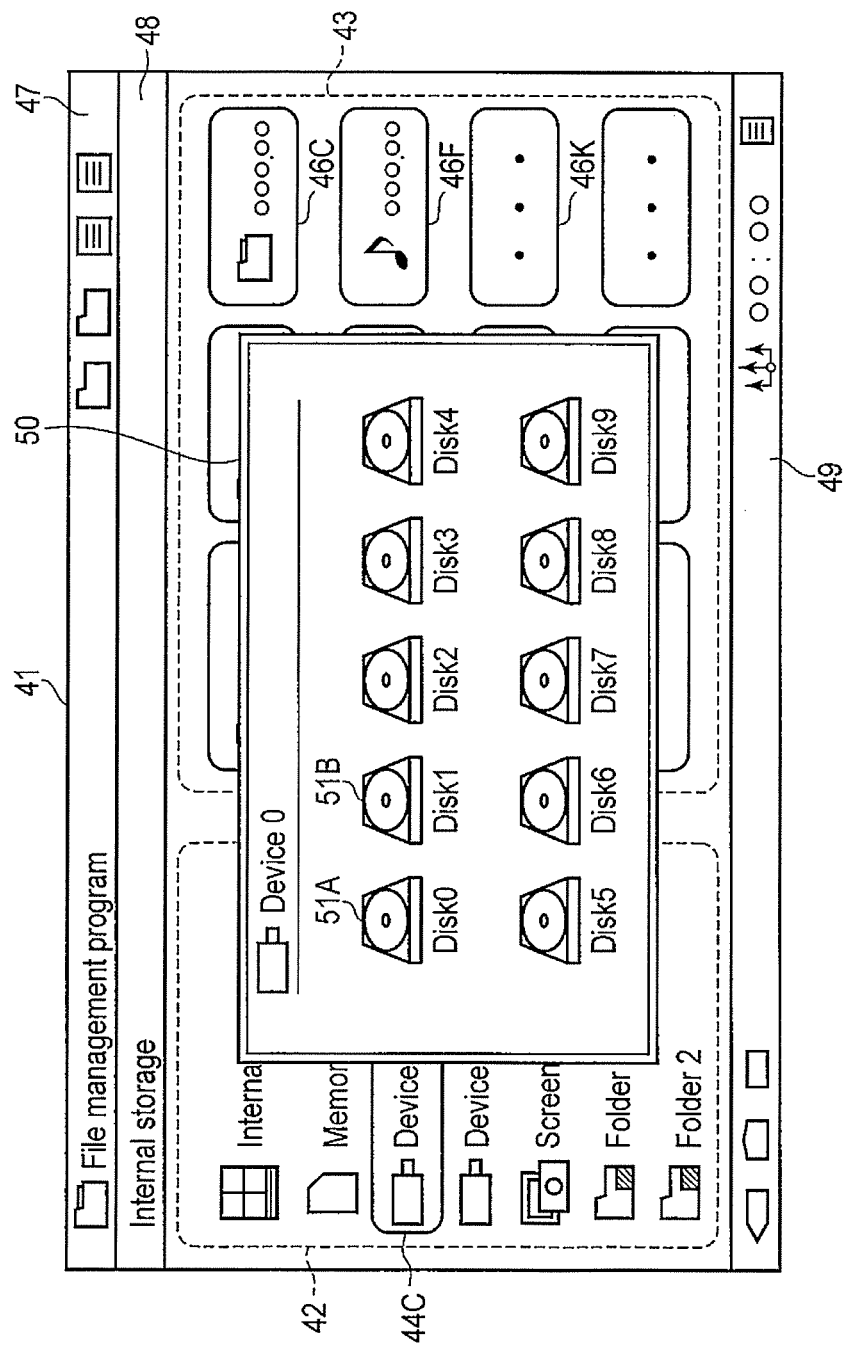
FIG. 5 is an exemplary view showing an example of a partition display screen which is displayed by executing the file management program according to the embodiment.

FIG. 5 shows an example when the USB storage includes a plurality of partitions and the user or the like selects a partition in the USB storage.

As described above, the partition display controller 37 controls the partition display. In FIG. 5, the USB storage corresponding to the item 44C has a plurality of partitions. When the USB storage is selected, the partition display controller 37 displays, on a partition display screen 50, information illustrating the partitions of the USB storage. As shown in FIG. 5, the partition display screen 50 is displayed to overlap the file management program display screen 41, device area 42, or data file area 43 (pop-up display). The pop-up display of partitions can emphasize that the partitions in the pop-up display are different from data files displayed in the data file area 43, for example, the partitions cannot be deleted, moved, or copied. Note that the partition display screen 50 need not always be the pop-up display. For example, when the item 44C is selected, the partition display screen 50 may be displayed in place of the data file area 43.

As shown in FIG. 5, a list of partitions of the USB storage is displayed on the partition display screen 50. The partition display screen 50 represents that the USB storage includes 10 partitions (Disk0 to Disk9). Partition items 51A, 51B, . . . may be used to display Disk0 to Disk9. Further, on the partition display screen 50, a notation representing that the partitions of the USB storage are currently displayed, may be displayed. This notation includes, for example, an icon associated with the USB storage and the name "device 0" of the USB storage, which are displayed at an upper portion in the partition display screen 50.

For example, when "Disk0" is selected from partitions displayed in the partition display screen 50, items representing data files in Disk0 are displayed in the data file area 43. At this time, "Disk0" may be displayed in the status area 48 or the like. In the device area 42, for example, item 44C is highlighted so that the user can recognize that item 44C representing device 0 serving as a storage device is selected. Hence, when items representing data files in Disk0 serving as one partition are displayed in the data file area 43, the user can grasp the storage device and partition to which the data files displayed in the data file area 43 belong.

In this fashion, items representing a plurality of partitions are displayed in the partition display area (screen) arranged to overlap the device area 42 where items representing storage devices are displayed. This can prevent giving the user a false impression that, for example, the pop-up display represents data folders.

Note that the partition display screen 50 need not always be displayed as a pop-up display at the center of the file management program display screen 41. The partition display screen 50 may be displayed to, for example, overlap the file management program display screen 41. Alternatively, the partition display screen 50 may be displayed in an area where the file management program display screen 41 is not displayed.

The partition information described with reference to FIG. 3 is information about the number of partitions, information about the size of each partition, information about the name of each partition, or the like.

Next, update of the display of the device area 42 will be explained with reference to FIG. 6. In FIG. 6, the display contents of the device area 42 change along with state transition when the storage devices are mounted in the computer 10. More specifically, after the USB storage is mounted, an icon representing the USB storage is displayed in the device area 42. Further, when a memory card device is mounted, an icon representing the memory card device is displayed in the device area 42. In other words, when the second storage device higher in the frequency than the first storage device is connected in a state in which the first storage device serving as one of the storage devices is connected to the computer 10, a plurality of items are displayed so that an item corresponding to the second storage device is displayed above an item corresponding to the first storage device.

State 1 (original) is an initial state. In the initial state, for example, no removable device is mounted. In state 1, an internal storage icon 60 and screen capture icon 61 are displayed in the device area 42. In state 1, the internal storage icon 60 is always displayed, and the screen capture icon 61 is displayed when an application corresponding to the screen capture icon 61 is installed. Note that the screen capture icon 61 indicates a data storage location which cannot be erased.

When removable device 0 is mounted in state 1, a USB storage icon 62 is displayed in the device area 42 (state 2). The USB storage device icon 62 is displayed between the internal storage icon 60 and the screen capture icon 61. Further, when the memory card device is mounted, a memory card device icon 63 is displayed in the device area 42 (state 3). The memory card device icon 63 is displayed between the internal storage icon 60 and the USB storage icon 62. In this manner, when the storage device is newly added, the display of the device area is updated.

The memory card device icon such as an SD Card® and a USB storage icon appear in case of mounting them. After unmounting the memory card device and/or the USB storage, an icon corresponding to the unmounted storage device disappears. In case of mounting or unmounting the storage device, control for a status representing that the storage device has been mounted or unmounted is transferred from hardware to software based on a mount event message which is broadcast from the storage device to the OS 201, file management program 202, or the like.

In this way, the display position of an icon associated with a newly added storage device in the device area 42 is determined based on the above-described frequency. More specifically, in case of the frequency of USB storage is lower than that of an internal storage, the USB storage icon 62 is displayed at a display position as represented by state 2 of FIG. 6. The screen capture icon 61 is displayed below icons representing the storage devices, for example, the internal storage icon 60 and the USB storage icon 62. In case of the frequency of the memory card device is lower than that of the internal storage and higher than that of the USB storage, the memory card device icon 63 is displayed at a display position as represented by state 3 of FIG. 6.

If a plurality of storage devices are of the same type, a plurality of items may be displayed based on the timings when the storage devices are mounted in the computer 10, so that an item corresponding to the storage device at an early timing is displayed above. Assuming that a plurality of the USB storages are mounted, item representing the USB storage mounted early among the plurality of the USB storage is displayed above item representing the USB storage mounted later.

The display in the device area as shown in FIG. 6 may be updated based on receiving the above-mentioned mount event message. The update of the display can be applied not only in case of the storage device is mounted, but also in case of the storage device is unmounted. More specifically, in case of the memory card device is unmounted in state 3, the state changes from state 3 to state 2 to update the display. Further, in case of the USB storage is unmounted in state 2, the state changes from state 2 to state 1 to update the display.

Only icons are displayed in the device area 42 in FIG. 6, but the name of the storage device may be displayed as shown in FIG. 4. The state 1 may be a case in which the file management program 202 is activated, installed, or the like. The state 1 may also be a state in which the storage device necessary to run the file management program 202 is mounted.

The procedure of display update processing by the file management program 202 will be described with reference to the flowchart of FIG. 7.

In block 70, the file management program 202 is run. FIG. 4 shows an example of a display screen in this case.

In block 71, the file management program 202 determines whether the device signal detection module 31 has newly detected a storage device. The file management program 202 waits until the storage device is newly detected. If the storage device has been newly detected, the process advances to block 72.

In block 72, the device display controller 36 which displays the item representing the storage device or the type of the storage device performs the display update processing to display, on the storage device basis, an icon associated with the newly detected storage device. FIG. 6 shows an example of the display update processing. When a plurality of storage devices are mounted, the device display controller 36 displays a plurality of items based on the mount frequency at which the storage device is mounted in the computer 10 or the access frequency indicating access to the storage device, so that an item corresponding to the storage device high in the mount frequency or the access frequency among the plurality of storage devices is displayed above.

In block 72, if a plurality of items include the first item corresponding to the internal storage arranged in the computer 10, the second item corresponding to the first removable storage arranged in the computer 10, and the third item corresponding to the second removable storage can be connected to the computer 10, the device display controller 36 displays these items in the order of the first item, the second item, and the third item.

In block 73, the file management program 202 determines whether a displayed device icon has been selected. The file management program 202 waits until the displayed device icon is selected. If the displayed device icon has been selected, the process advances to block 74.

In block 74, the file management program 202 determines whether the selected device includes a plurality of partitions. If the partition detection module 34 detects a plurality of partitions, the process advances to block 75. If the partition detection module 34 does not detect a plurality of partitions, the process advances to block 78.

In block 75, the partition display controller 37 displays the partition item representing the partition of the selected storage device and the icon of the selected storage device. FIG. 5 shows an example of a display screen regarding the processing in block 75. The partition is displayed as a menu for displaying a partition list. In case of the storage device is selected and includes a plurality of partitions, the partition item representing the plurality of partitions can be displayed. It suffices to display the partition list so that the user can recognize the partition list. For example, the partition list may be displayed in an area within the file management program display screen 41 other than the device area 42 and data file area 43.

In block 76, the file management program 202 determines whether a partition icon has been selected. The file management program 202 waits until the partition icon is selected. If the partition icon has been selected, the process advances to block 77.

In block 77, the file display controller 38 displays data files or data folders in the selected partition.

In block 78, if the plurality of partitions have not been detected in block 74, the items representing data files or data folders in the selected storage device are displayed. In this fashion, in case of the storage device is selected and does not include the plurality of partitions, the items representing data files in the storage device are displayed.

As described above, according to the embodiment, a data file can be easily accessed. This is advantageous for the user to access the data file. Storage devices connected to the computer 10 are displayed not on the partition basis of the storage device but on the device basis, so the user can easily access the data file. When a connected storage device includes a plurality of partitions, by selecting the storage device, the partitions of the selected storage device is displayed. By displaying the partitions of the selected storage device, the user can easily recognize the correspondence between the storage device and the partitions. Also, a GUI design such that the user can easily recognize the state of a connected storage device can be displayed. By the pop-up display of partitions, the partitions can be displayed so that the user can grasp the difference between data files or the storage device, and partitions without giving a false impression to the user. If a plurality of storage devices are removed frequently, the plurality of storage devices are displayed in a specific order. In case the display is updated, it can be prevented to frequently switch the display contents.

The function of the file management program 202 described in the embodiment may be implemented by a hardware component such as a dedicated LSI, DSP, or microcomputer.

Note that all the file display processing procedures in the embodiment can be executed by a software program. This program is installed in a general-purpose computer via a computer-readable storage medium storing the program for executing the file display processing procedures. By executing this program, the same effects as those of the embodiment can be easily implemented.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   at least one storage device;
   a screen; and
   one or more processors configured to:
   display, in a first display area of the screen, one or more first icons indicative of the at least one storage device,
   receive a selection of a selected first icon of the one or more first icons;
   determine whether a first storage device of the at least one storage device that corresponds to the selected first icon is divided into partitions, wherein each of the partitions has a respective constant size irrespective of a size of data stored in each of the partitions and the first storage device of the at least one storage device stores data files and at least one data folder;
   display second icons indicative of partitions of the first storage device of the at least one storage device in response to a determination of the first storage device of the at least one storage device being divided into the partitions, and
   display, in a second display area of the screen, third icons indicative of data files stored in the first storage device of the at least one storage device and one or more fourth icons indicative of at least one data folder stored in the first storage device of the at least one storage device in response to a determination of the first storage device of the at least one storage device not being divided into the partitions.

2. The apparatus of claim 1, wherein, when one of the partitions is selected based on a selected second icon of the second icons, the one or more processors are further configured to display fifth icons indicative of data files stored in the selected partition and one or more sixth icons indicative of at least one data folder stored in the selected partition.

3. The apparatus of claim 2, wherein the one or more processors are further configured to display the second icons in one of the second display area, or a third display area overlapping (i) the first display area and (ii) the second display area.

4. The apparatus of claim 3, wherein the one or more processors are further configured to display the second icon below the first icon.

5. The apparatus of claim 4, wherein the one or more processors are further configured to display the one or more first icons in an order based on a use frequency of the at least one storage device.

6. The apparatus of claim 5, wherein the one or more processors are further configured to display the one or more first icons in an order of an internal storage, a first removable storage in the information processing apparatus, and a second removable storage externally connected to the information processing apparatus.

7. The apparatus of claim 4, wherein the one or more processors are further configured to display a seventh icon indicative of a data storage location configured not to be erased.

8. The apparatus of claim 5, wherein the use frequency comprises a connection frequency between the at least one storage devices and the information processing apparatus or an access frequency for the at least one storage device, and
   wherein the one or more processors are further configured to display the selected first icon of the one or more first icons indicative of the first storage device of the at least one storage device above a second icon of the one or more first icons indicative of a second storage device of the at least one storage device, and the use frequency of the first storage device is higher than the use frequency of the second storage device.

9. The apparatus of claim 5, wherein the one or more processors are further configured to display the selected first icon of the one or more first icons indicative of the first storage device of the at least one storage device above a second icon of the one or more first icons indicative of a second storage device of the at least one storage device, and the use frequency of the first storage device is higher than the use frequency of the second storage device.

10. The apparatus of claim 5, wherein the one or more processors are further configured to display the first icon indicative of the first storage device of the at least one storage device above a second icon indicative of a second storage device of the at least one storage device, the use frequency of the first storage device is equal to the use frequency of the second storage device, and a timing when the first storage device is connected to the information processing apparatus is earlier than a timing when the second storage device is externally connected to the information processing apparatus.

11. A display processing method for an information processing apparatus comprising at least one storage device and a screen, the method comprising:
displaying, by one or more processors, one or more first icons indicative of the at least one storage device in a first display area of the screen;
receiving a selection of a selected first icon of the one or more first icons;
determining whether a first storage device of the at least one storage device that corresponds to the selected first icon is divided into partitions, wherein each of the partitions has a respective constant size irrespective of a size of data stored in each of the partitions and the first storage device of the at least one storage device stores data files and at least one data folder;
displaying, by one or more processors, second icons indicative of partitions of the first storage device of the at least one storage device in response to a determination of the first storage device of the at least one storage device being divided into the partitions; and
displaying, by one or more processors, in a second display area of the screen, third icons indicative of data files stored in the first storage device of the at least one storage device and one or more fourth icons indicative of at least one data folder stored in the first storage device of the at least one storage device, when in response to a determination of the first storage device of the at least one storage device not being divided into the partitions.

12. The method of claim 11, further comprising:
when one of the partitions is selected based on a selected second icon of the second icons, displaying, by one or more processors, fifth icons indicative of data files stored in the selected partition and one or more sixth icons indicative of at least one data folder stored in the selected partition.

13. The method of claim 12, further comprising displaying the second icons in one of the second display area, or a third display area overlapping (i) the first display area and (ii) the second display area.

14. The method of claim 13, wherein the second icon is displayed below the first icon.

15. The method of claim 14, wherein at least two first icons of the one or more first icons indicative of at least two storage devices are displayed in an order based on a use frequency of the at least two storage devices.

16. The method of claim 14, wherein the one or more first icons are displayed in an order of an internal storage, a first removable storage in a device including the one or more processors, and a second removable storage externally connected to the device including the one or more processors.

17. The method of claim 15, wherein the use frequency comprises a connection frequency between the at least two storage devices and the one or more processors or an access frequency for the at least two storage devices, and
the selected first icon of the one or more first icons indicative of the first storage device is displayed above a second icon of the one or more first icons indicative of a second storage device, the use frequency of the first storage device being higher than the use frequency of the second storage device.

18. A computer-readable, non-transitory storage medium having stored thereon a computer program which is executable by a computer, the computer program controlling the computer to execute functions of:
displaying, in a first display area of a screen, one or more first icons indicative of at least one storage device;
receiving a selection of a selected first icon one of the one or more first icons;
determining whether a first storage device of the at least one storage device is divided into partitions, wherein each of the partitions having a respective constant size irrespective of a size of data stored in each of the partitions;
displaying second icons indicative of partitions of the first storage device of the at least one storage device in response to a determination of the first storage device of the at least one storage device being divided into partitions; and
displaying, in a second display area of the screen, one or more third icons indicative of at least one data file stored in the first storage device of the at least one storage device and one or more fourth icons indicative of at least one data folder stored in the first storage device of the at least one storage device, in response to a determination of the first storage device of the at least one storage device not being divided into the partitions.

19. The storage medium of claim 18, further comprising:
when one of the partitions is selected based on a selected second icon of the second icons, displaying, by one or more processors, fifth icons indicative of data files stored in the selected partition and one or more sixth icons indicative of at least one data folder stored in the selected partition.

20. The storage medium of claim 19, further comprising displaying the second icons in one of the second display area, or a third display area (i) overlapping the first display area and (ii) the second display area.

21. The storage medium of claim 20, wherein the selected second icon is displayed below the selected first icon.

22. The storage medium of claim 21, wherein at least two first icons of the one or more first icons indicative of at least two storage devices are displayed in an order based on a use frequency of the at least two storage devices.

23. The storage medium of claim 21, wherein the one or more first icons are displayed in an order of an internal storage, a first removable storage in a device including one or more processors, and a second removable storage externally connected to the device including the one or more processors.

24. The storage medium of claim 22, wherein
the use frequency comprises a connection frequency between the at least two storage devices and the one or more processors or an access frequency for the at least two storage devices, and
the first icon of the one or more first icons indicative of the first storage device is displayed above a second icon of the one or more first icons indicative of a second storage device, the use frequency of the first storage device being higher than the use frequency of the second storage device.

* * * * *